(12) United States Patent
Gunji et al.

(10) Patent No.: US 12,050,902 B2
(45) Date of Patent: Jul. 30, 2024

(54) VEHICLE CONTROL DEVICE AND PROGRAM MANAGEMENT METHOD

(71) Applicant: HITACHI ASTEMO, LTD., Hitachinaka (JP)

(72) Inventors: Shota Gunji, Ibaraki (JP); Yusuke Kogure, Ibaraki (JP); Kentarou Yoshimura, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 108 days.

(21) Appl. No.: 17/783,530

(22) PCT Filed: Nov. 20, 2020

(86) PCT No.: PCT/JP2020/043335
§ 371 (c)(1),
(2) Date: Jun. 8, 2022

(87) PCT Pub. No.: WO2021/117463
PCT Pub. Date: Jun. 17, 2021

(65) Prior Publication Data
US 2022/0398089 A1 Dec. 15, 2022

(30) Foreign Application Priority Data
Dec. 12, 2019 (JP) .................. 2019-224391

(51) Int. Cl.
*G06F 8/65* (2018.01)
*B60R 16/02* (2006.01)
(Continued)

(52) U.S. Cl.
CPC ............... *G06F 8/65* (2013.01); *B60R 16/02* (2013.01); *G06F 8/71* (2013.01); *G06F 9/445* (2013.01)

(58) Field of Classification Search
CPC ............................. G06F 8/60–66; G06F 9/445
(Continued)

(56) References Cited

U.S. PATENT DOCUMENTS

2019/0258470 A1* 8/2019 Miyake .................... G06F 8/65

FOREIGN PATENT DOCUMENTS

| JP | 2013-006482 A | 1/2013 |
| JP | 2013-041436 A | 2/2013 |
| JP | 2019-109746 A | 7/2019 |

OTHER PUBLICATIONS

Mbakoyiannis, Dimitris, et al., Secure over-the-air firmware updating for automotive electronic control units, SAC '19: Proceedings of the 34th ACM/SIGAPP Symposium on Applied Computing, Apr. 2019, 8 pages, [retrieved on Mar. 22, 2024], Retrieved from the Internet: <URL:http://dl.acm.org/>.*

(Continued)

*Primary Examiner* — Geoffrey R St Leger
(74) *Attorney, Agent, or Firm* — Foley & Lardner LLP

(57) ABSTRACT

Matching programs are activated by a plurality of calculation units. A vehicle control device that controls a vehicle includes a plurality of calculation units that execute calculation processing for vehicle control; and a plurality of program storage areas that store a plurality of programs in which a procedure of the calculation processing is defined, wherein a main calculation unit includes a main program activation unit that activates one main program from the plurality of main programs, and a sub-calculation unit includes a sub-program selection unit that selects a sub-program to be activated by the sub-calculation unit based on an activation result of the main program activation unit, and a sub-program activation unit that activates one sub-program based on a selection result of the sub-program selection unit.

7 Claims, 13 Drawing Sheets

(51) Int. Cl.
　　　*G06F 8/71*　　　　(2018.01)
　　　*G06F 9/445*　　　(2018.01)
(58) Field of Classification Search
　　　USPC .................................................. 717/168–178
　　　See application file for complete search history.

(56) References Cited

OTHER PUBLICATIONS

Steger, Marco, et al., An Efficient and Secure Automotive Wireless Software Update Framework, IEEE Transactions on Industrial Informatics, May 2018, 13 pages, [retrieved on Mar. 22, 2024], Retrieved from the Internet: <URL:http://ieeexplore.ieee.org/>.*
International Search Report with English Translation and Written Opinion for Application No. PCT/JP2020/043335 dated Mar. 2, 2021 (7 pages).

* cited by examiner

VEHICLE CONTROL DEVICE AND PROGRAM MANAGEMENT METHOD

TECHNICAL FIELD

The present invention relates to a vehicle control device, and more particularly to a technique for managing a program version.

BACKGROUND ART

As one of program update methods for an electronic control unit (ECU) of a vehicle, there is an online update function that downloads a program wirelessly distributed from a program distribution center via a network and updates the program of the ECU.

In the related art, the program is updated using a dedicated device connected to a vehicle brought to a dealer. However, according to the online update function, the program can be updated without bringing the vehicle to the dealer. Application of a new program enables addition of functions, improvement of functions, and correction of problems, thereby improving convenience and saving time.

In recent years, in development of an embedded system and a general-purpose server, a multiprocessor system having a plurality of central processing units (CPUs) has attracted attention as performance of the system is improved. In general, a multi-core processor in which a plurality of cores is enclosed in one CPU or a multiprocessor system having a plurality of CPUs can reduce power consumption as compared with a single processor in addition to improving the processing speed of the processor.

However, since it is necessary to newly add a loader to acquire activation programs of a plurality of slave processors, the number of pieces of hardware constituting the slave processors increases, and it is not possible to suppress complication of the system. Since it is assumed that a multiprocessor having a homogeneous configuration in which a plurality of processors of the same type is mounted is used, there is a problem in that it is not possible to apply to a multiprocessor having a heterogeneous configuration in which a plurality of processors of different types is mounted. There is a multiprocessor system disclosed in PTL 1 that solves this problem, suppresses the number of pieces of hardware, and implements a multiprocessor system and an activating method capable of simplifying the configuration of the entire device.

The multiprocessor system disclosed in PTL 1 includes a master processor and one or a plurality of slave processors, and the master processor includes a program ROM that stores activation programs of the master processor and the slave processor, a master RAM that develops the activation program of the master processor, a master CPU that performs activation processing based on the developed activation program, and a master-side data I/F that transfers the activation program of the slave processor to the slave processor. The slave processor includes a slave-side data I/F that receives the activation program of the slave processor from the master-side data I/F, a slave RAM that develops the received activation program, and a slave CPU that performs the activation processing based on the developed activation program (see abstract).

CITATION LIST

Patent Literature

PTL 1: JP 2013-41436 A

SUMMARY OF INVENTION

Technical Problem

In the multiprocessor system disclosed in PTL 1, the master processor transmits the activation program to the slave processor and develops the activation program in the RAM, thereby reducing the program ROM in the slave processor and reducing the number of hardware. However, in this multiprocessor system, the master processor has only a single control program, and in a vehicle control device having a plurality of calculation units having two different versions of programs, each calculation unit operates with a program aligned in a unified program version, and thus, this technique cannot be applied.

An object of the present invention is to provide a program management method in which, in a vehicle control device in which each of a plurality of calculation units corresponding to the above-described online update function has two different versions of programs, another calculation unit notifies a version of the program in order to select one program from the plurality of programs on the basis of an activation result of a program version of the program activated by one of the plurality of calculation units.

Solution to Problem

A representative example of the invention disclosed in the present application is as follows. That is, a vehicle control device that controls a vehicle, the vehicle control device including: a plurality of calculation units that executes calculation processing for vehicle control; and a program storage area that stores a plurality of programs in which a procedure of the calculation processing is defined, wherein the program storage area includes a main program storage area that stores a plurality of main programs and a sub-program storage area that stores a plurality of sub-programs, the calculation unit includes a main calculation unit that activates and executes one of the plurality of main programs and a sub-calculation unit that activates and executes one of the plurality of sub-programs, the main calculation unit includes a main program activation unit that activates one main program from the plurality of main programs, and the sub-calculation unit includes a sub-program selection unit that selects the sub-program to be activated by the sub-calculation unit based on an activation result of the main program activation unit and a sub-program activation unit that activates one sub-program based on a selection result of the sub-program selection unit.

Advantageous Effects of Invention

According to the present invention, even if each of the calculation units independently has a different program, another calculation unit can activate a program that matches the activation result of the program activated by one calculation unit. Problems, configurations, and effects other than those described above will be clarified by the following description of embodiments.

DESCRIPTION OF EMBODIMENTS

Hereinafter, embodiments will be described with reference to the drawings.

An embodiment of the present invention will be described with reference to FIGS. 1 to 14.

First Embodiment

Figure 1:
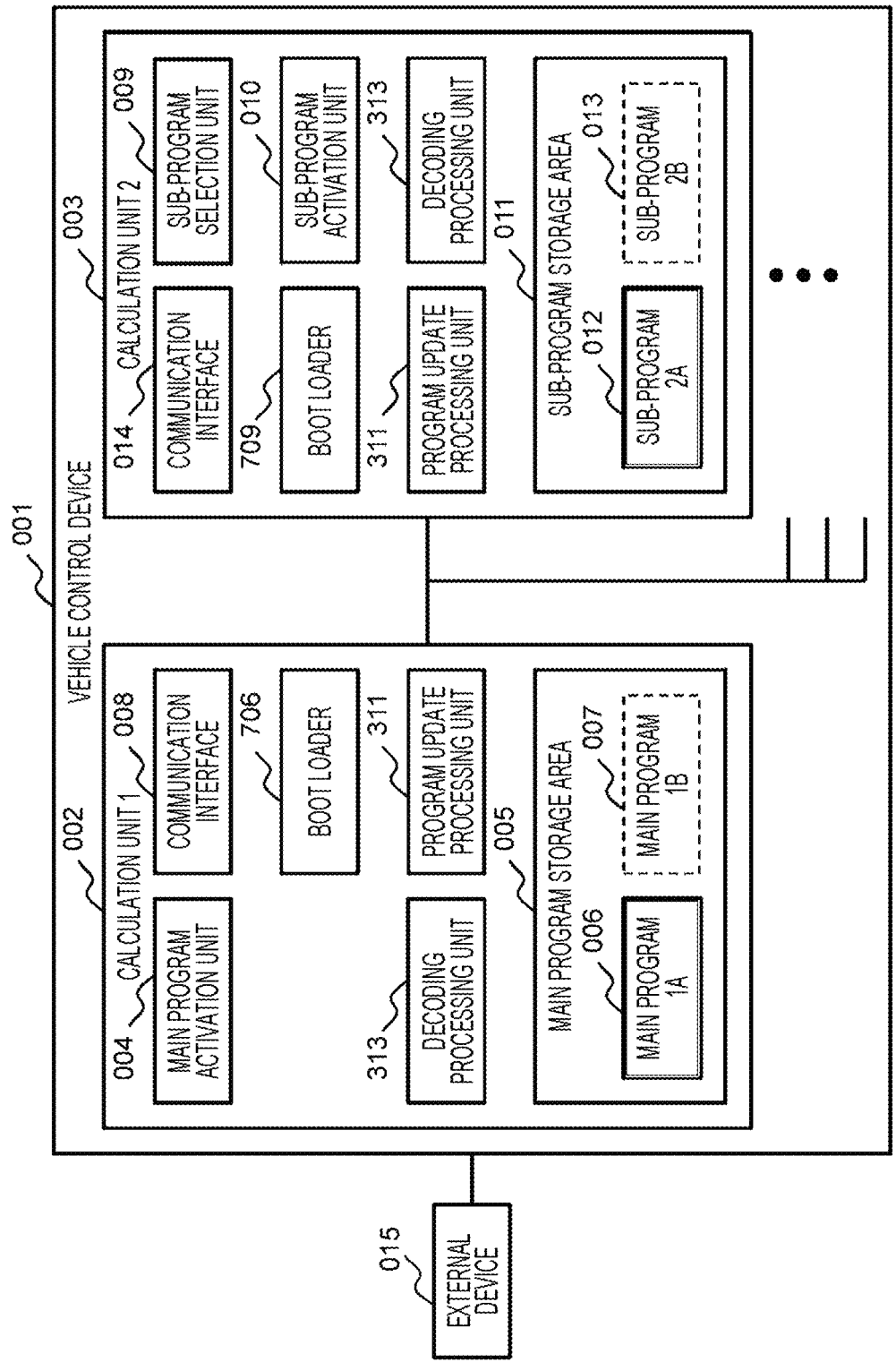
FIG. 1 is a configuration diagram of a vehicle control device including a plurality of calculation units according to a first embodiment of the present invention.

FIG. 1 is a configuration diagram of a system (vehicle control device) including a plurality of calculation units according to a first embodiment of the present invention. A vehicle control device 001 of the present embodiment includes a calculation unit 1 002 and a calculation unit 2 003. The calculation unit 1 002 includes a main program activation unit 004 and a main program storage area 005, and the main program storage area 005 includes a main program 1A 006 and a main program 1B 007 which are programs of the same type having different versions. In the illustrated state, the main program 1A 006 is activating, and the main program 1B 007 is not activating. A communication interface 008 transmits information on the version of the program activated by the calculation unit 1 002 to the calculation unit 2 003. Note that the number of calculation units included in the vehicle control device 001 may be two or more, and variations of the vehicle control device depending on the number of calculation units will be described in second to fourth embodiments.

The calculation unit 2 003 includes a sub-program selection unit 009, a sub-program activation unit 010, and a sub-program storage area 011, and the sub-program storage area 011 includes a sub-program 2A 012 and a sub-program 2B 013 which are the same type of programs with different versions. In the illustrated state, the sub-program 2A 012 is activating, and the sub-program 2B 013 is not activating. A communication interface 014 receives information on the version of the program activated by the calculation unit 1 002 from the calculation unit 1 002.

The vehicle control device 001 is a vehicle control device that has a processor capable of executing an independent program in each of the calculation units 002 and 003 and is compatible with an online update function capable of updating the program executed in each of the calculation units 002 and 003 according to the version.

By executing the main program activation unit 004 at the time of activation, the calculation unit 1 002 determines and activates the version of the program to be activated this time according to the version information of the program executed in the previous travel among the main program 1A 006 or the main program 1B 007 stored in the main program storage area 005. Information on the version of the activated program is transmitted to the calculation unit 2 003 via the communication interface 008.

The version of the program activated by the calculation unit 1 002 is notified to the calculation unit 2 003 from the calculation unit 1 002 via the communication interface 014. The sub-program selection unit 009 that has received the notification determines information on the version of the program to be activated by the calculation unit 2 003 according to the information on the version of the program activated by calculation unit 1 002. The determined version of the program is notified to the sub-program activation unit 010. The sub-program activation unit 010 activates either the sub-program 2A 012 or the sub-program 2B 013 stored in the sub-program storage area 011 according to the determination by the sub-program selection unit 009.

A configuration example of an external device 015 will be described with reference to FIG. 2.

The external device 015 includes an OTA center 101, an antenna ECU 102, and a central gateway (CGW) 103.

The OTA center 101 manages programs and distributes the managed programs by communication. The OTA center 101 stores programs of all models to be serviced, service target vehicles, program mounting information of each vehicle, and necessary data relating to other services, and transmits the stored data as necessary in the vehicle.

Here, when it is determined that the program is updated to the latest version for the purpose of improving the performance of the vehicle in a certain vehicle, a necessary update program for the vehicle is distributed by wireless communication. The antenna ECU 102 of the corresponding vehicle receives the distributed information as communication with a host vehicle. The received update program is directly transferred to CGW 103 via CAN. The CGW 103 specifies an ECU (target ECU 001) to which the corresponding program is rewritten among the plurality of ECUs capable of communicating with the CGW 103 based on the information (header) attached to the information, and distributes the update program to the target ECU 001 using CAN. Here, in the information communication from 101 to 001, interception from the outside or modification of data may occur. Since data transfer is performed via CAN, which is a type of wireless communication and in-vehicle communication, there is concern about system safety. Therefore, communication contents are encrypted to prevent interception from the outside and data modification. Furthermore, information is encrypted and decrypted from encryption by using unique information shared only by an encryption device and a decryption device, a so-called key, and confidentiality to the outside is improved.

The operations of the CGW 103 and the target ECU 001 will be described with reference to FIG. 3.

The target ECU 001 stores a cipher text 202 received as a rewriting program for the target ECU 001. Generally, the program is a large-capacity program that occupies most of the flash memory of the nonvolatile storage device in the ECU. Here, the cipher text 202 is configured by an aggregate of further segmented cipher texts 203. The segmented cipher text 203 is distributed and stored in a primary storage RAM 213 of the target ECU 001 by communication means. The target ECU 001 decrypts a cipher text 211 into a plain text 212 using the held unique information of encryption/decryption, and writes a decrypted plain text 212 into the flash memory 214. This series of operations is repeated until all of the segmented cipher text 203 held by the CGW 103 is received and writing is completed. When the program is updated by this method, the area for storing the segmented cipher text 203 and the area for storing the plain text 212 in the primary storage RAM 213 repeatedly store different contents. Therefore, it is not necessary to store the entire program at a time, and rewriting can be performed with a capacity sufficiently smaller than the required capacity of the entire program.

Figure 3:
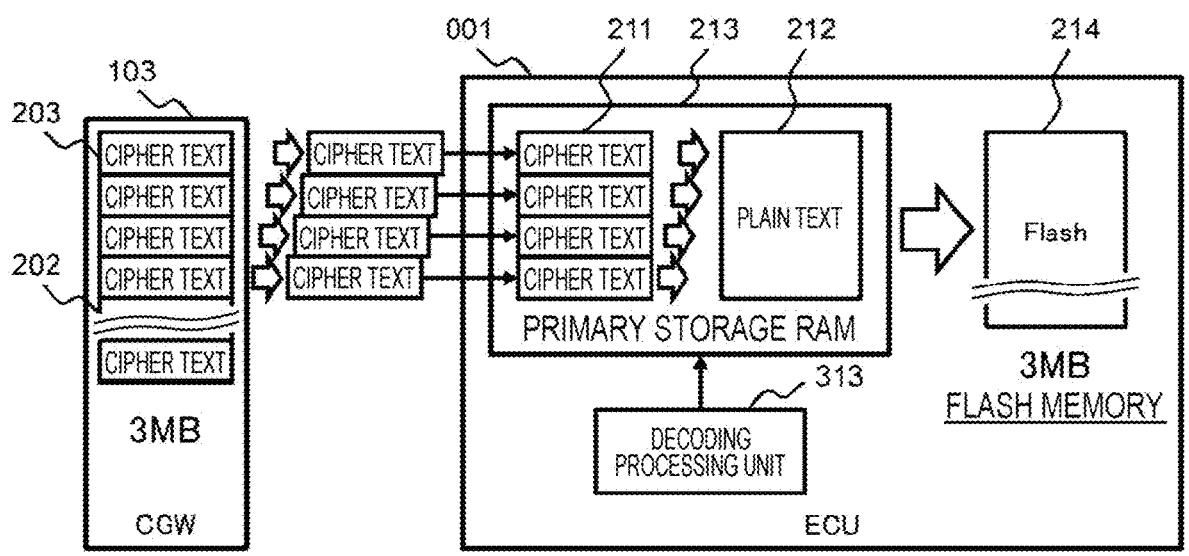
FIG. 3 is a diagram illustrating operations of a GW and a target ECU.
Figure 4:
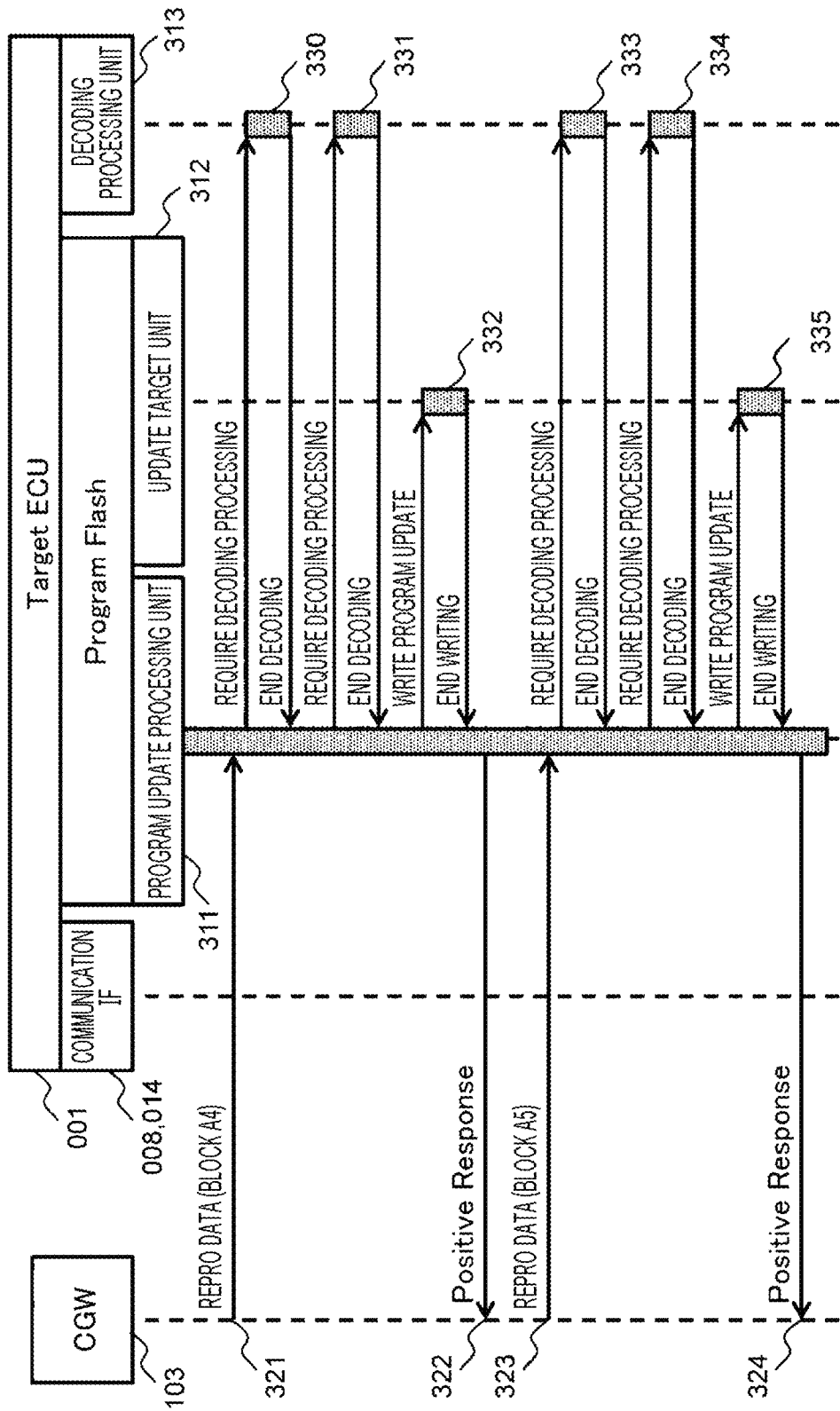
FIG. 4 is a diagram illustrating operations of the GW and the target ECU.

FIG. 4 is a diagram describing the operation described in FIG. 3 according to the flow of time.

First, block data A4 321, which is one of the segmented cipher texts 203, is distributed from the CGW 103 to a program update processing unit 311. The program update processing unit 311 divides a part of the block data A4 321 in an amount appropriate for decoding the encryption, transmits the divided part to the decoding processing unit 313 together with a decoding processing request of the cipher text, and requests decryption of the cipher text. The decoding processing unit 313 executes decoding processing 330 and returns decoding completion to the program update processing unit 311. In processing 331, as in the processing 330, the remaining cipher text decrypted in the processing 330 is decrypted, and decryption processing for the block data A4 321 is completed. In the illustrated example, one block data is decoded by two times of decoding processing, but an optimum value of the number of times of decoding may be selected in consideration of a processing speed and a memory capacity of a program.

Next, the program update processing unit 311 writes the program of the block data A4 that has been decoded into an update target unit 312 (program storage area 005, 011) in processing 332. Upon completion of writing from the update target unit 312, the CGW 103 is returned from a processing normal end 322 of the block data A4 321.

The series of processes described above is processing of writing the block data A4 321, and the CGW 103 starts the processing for A5 which is the next block in a similar procedure. That is, decryption processing 333 of block data A5 323 is performed similarly to the processing 330, and the remaining cipher text decrypted in processing 333 is decrypted (334). Then, the program of the block data A5 that has been decoded is written to the update target unit 312 (program storage area 005, 011) in processing 335, and upon completion of the writing from the update target unit 312, a processing normal end 324 of the block data A5 323 is returned to the CGW 103.

By repeatedly executing this processing for all the segmented cipher texts, writing of the entire program is terminated.

Figure 5:
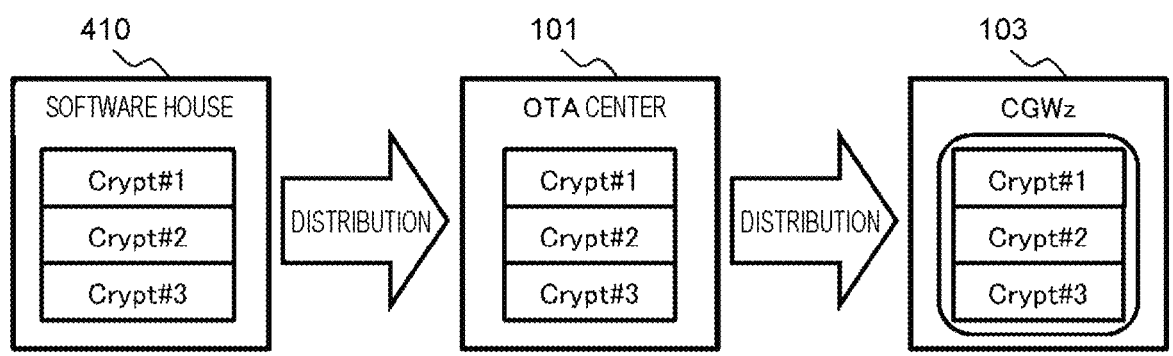
FIG. 5 is a diagram illustrating an embodiment of a program divided as a cipher text.

Although it has been described in FIG. 3 that the divided program is stored in the CGW 103 as the cipher text, an embodiment for realizing the program will be described with reference to FIG. 5.

Figure 2:
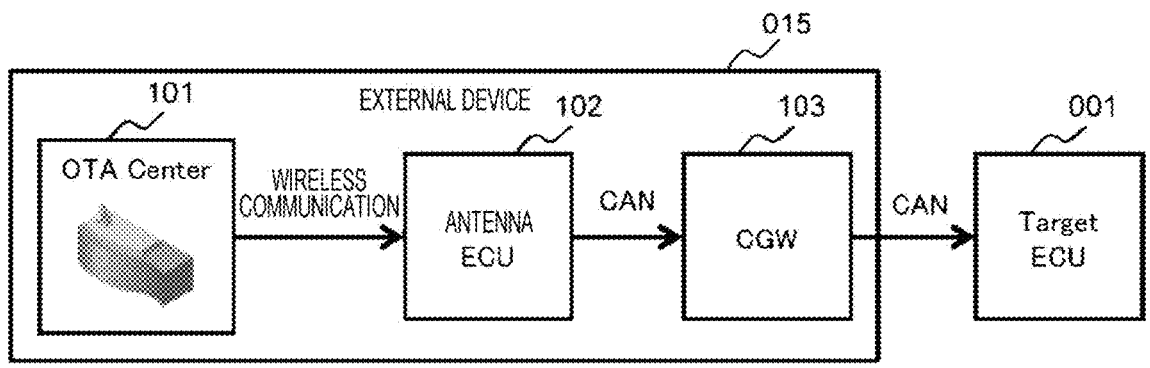
FIG. 2 is a diagram illustrating a configuration example of an external device.

As illustrated in FIG. 2, the program is stored in the OTA center 101. The programs stored in the OTA center 101 are designed and manufactured in a software house 410.

In the software house 410, the entire design is optimized including the rewriting operation in the ECU. Therefore, an appropriate unit of encryption is designed in consideration of the specification of a memory space of the ECU as a premise of the series of rewriting work, the time required for the series of processes, and the like. Next, the update program is divided and encrypted according to the unit of encryption. Typically, unique information of encryption called a key may be arranged only in decryption software arranged in a non-rewriting area of the ECU to ensure confidentiality. The program manufactured by this method is provided to the OTA center 101 together with information indicating the target ECU 001 and information for rewriting the program (for example, information of the program before rewriting). The OTA center 101 transmits the encrypted program and the target ECU information to the program rewrite target vehicle to be separately determined. In this series of operations, since the OTA center 101 does not have the key of the encrypted program, the contents cannot be viewed or changed. Similarly, the CGW 103 does not have a normal key for the encrypted program, and thus cannot view or change the content.

By the above processing, the encrypted program created in the software house 410 is distributed to the CGW 103 and stored without being changed.

Figure 6:
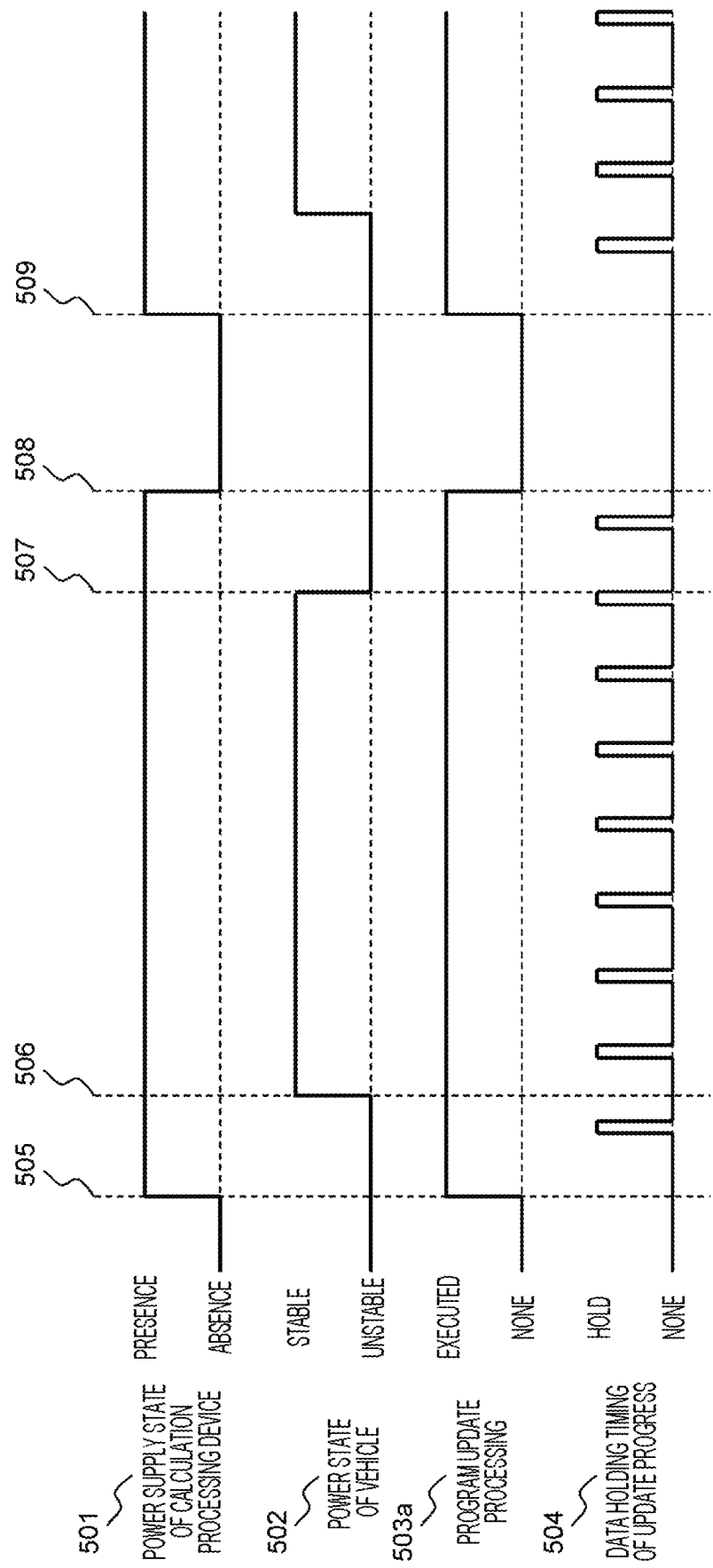
FIG. 6 is a time chart illustrating a program update operation.

The program update operation will be described with reference to the time chart of FIG. 6. FIG. 6 illustrates a relationship among a power supply state 501 of a calculation processing device, a power state 502 of a vehicle, program update processing 503a, and data holding timing 504 of an update progress.

The power supply state 501 of the calculation processing device indicates the presence or absence of power supply to the vehicle control device 001. The power state 502 of the vehicle indicates whether power supply to the vehicle control device 001 is stable. For example, when the ignition is turned on, charging of the battery is started, and an ACC power supply is not disconnected, so that it can be said that the battery is in a stable state. In a case of an EV car, it can be said that the EV car is in a stable state if the battery is charged in a charging stand. Note that the power supply state 501 of the vehicle may not be acquired from the calculation processing device. The program update processing 503a indicates whether or not to update the program when the update program is distributed from the external device 015. The holding timing 504 of the update progress data indicates a timing to hold information indicating an area where writing of the update program has been normally completed.

When the power supply to the vehicle control device 001 is started at the timing 505, the power state 502 of the vehicle is unstable, but the program update processing 503a is started. The program update processing 503a writes the update program in units of a predetermined size, and holds the update progress data in units of writing of the update program. At timing 506, the power state 502 of the vehicle is stabilized. Thereafter, regardless of the power state 502 of the vehicle, the vehicle control device 001 continuously performs the program update processing and the data of the update progress.

When the power state 502 of the vehicle becomes unstable at the timing 507, the program update processing and the data of the update progress are continuously held. If the program is being updated at timing 508 when the power supply to the vehicle control device 001 is stopped, invalid data remains. When the power supply to the vehicle control device 001 is resumed at timing 509, the program update processing is resumed from the area next to the update progress data stored before the power supply is stopped. Since the processing is resumed from the region next to the region where the writing of the update program is normally completed, the remaining invalid data is overwritten with the normal data when the power supply is stopped.

Figure 7:
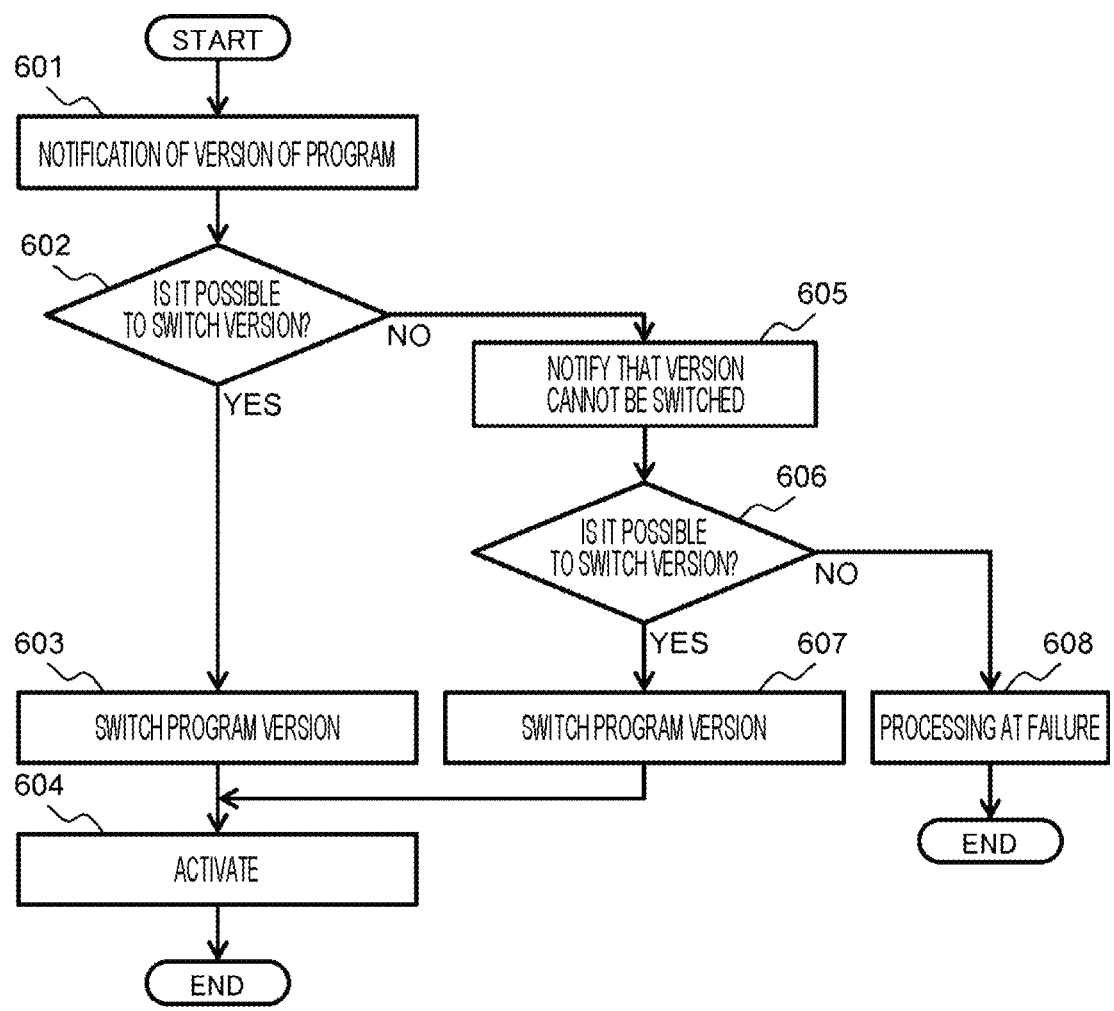
FIG. 7 is a flowchart of processing for determining whether to switch a version of a program.

FIG. 7 is a flowchart of processing for determining whether to switch the version of the program when the version of the program activated by the calculation unit is notified. First, when a notification of the version of the program is received from another calculation unit (601), the calculation unit determines whether the program can be activated by a program suitable for the received version of the program, that is, whether the version can be switched (602). If the version of the program can be switched, the program is switched to the notified version of the program (603), and the program is activated (604). When it is determined that the program version cannot be switched, the calculation unit of the notification source of the program version is notified that the notified program version cannot be activated (605).

The calculation unit notified of the inactivation determines whether or not the program version can be switched (606). If the version of the program can be switched, the program is switched to another version of the program (607), and the program is activated (604). When it is determined that the switching cannot be performed, since the programs cannot be activated by the combination of the versions of the normal programs, processing 608 at failure is performed in such a manner that the programs cannot be activated by the combination of the correct versions in the calculation unit that executes the main program and the calculation unit that executes the sub-program, and thus, the activation of the vehicle control device 001 is stopped, the fact that the vehicle control device 001 has failed is transmitted to another vehicle control device, and a failure state is recorded. By executing these processes, activation of the vehicle control device that may not operate normally due to version mismatch between the main program and the sub-program is prevented.

Figure 8:
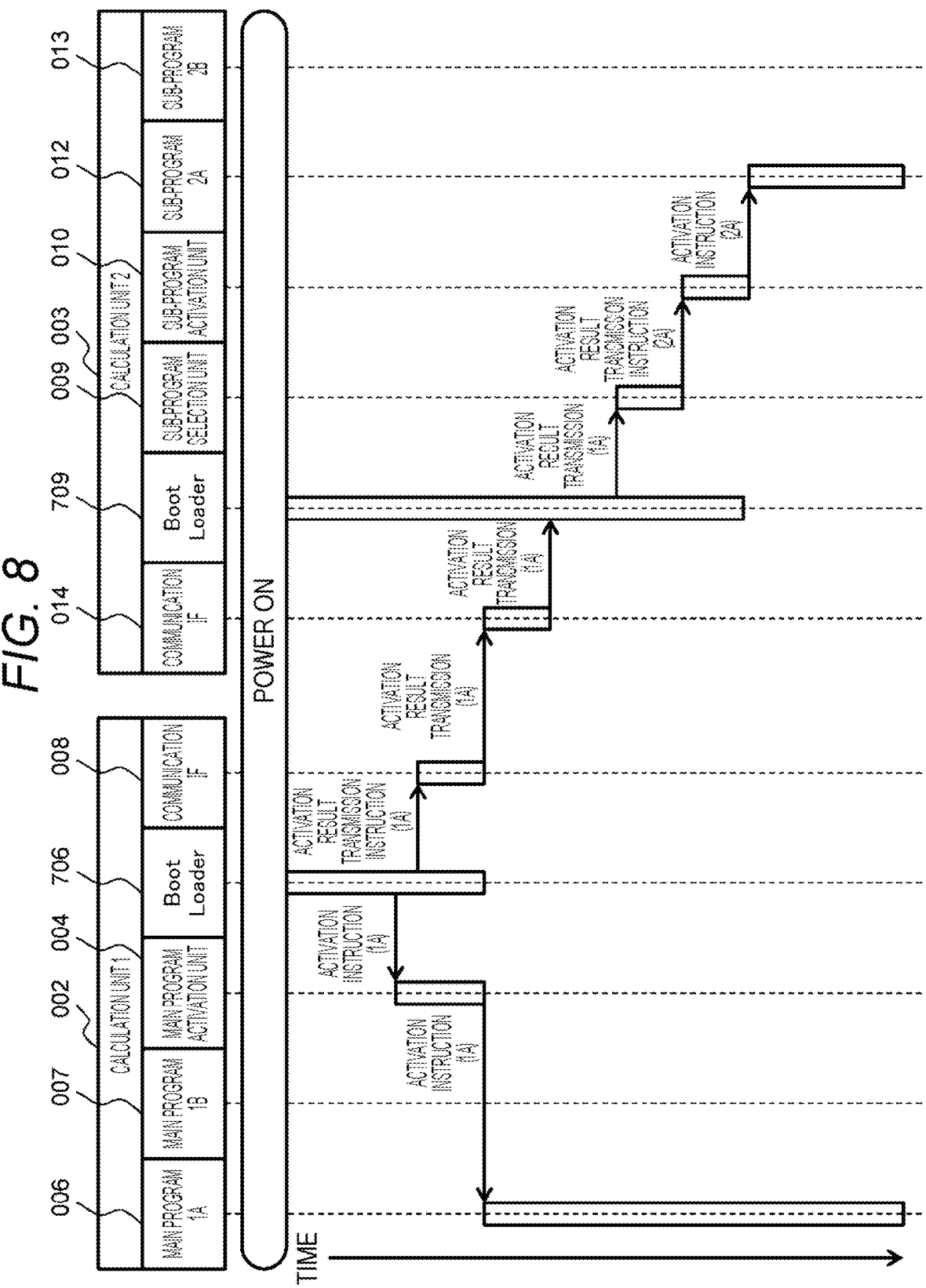
FIG. 8 is a sequence diagram of a notification operation in a case of activating with a program version A.

An operation of notifying the program version to the calculation unit 2 003 when the calculation unit 1 002 activates the main program 1A 006 will be described with reference to FIG. 8. FIG. 8 illustrates a relationship among the calculation unit 1 002, the calculation unit 2 003, the main program 1A 006, the main program 1B 007, the main program activation unit 004, a boot loader 706, a communication IF 008, a communication IF 014, a boot loader 709, the sub-program selection unit 009, the sub-program activation unit 010, a sub-program 2A 012, and the sub-program 2B 013.

In FIG. 8, the boot loader 706 included in the calculation unit 1 002 notifies the main program activation unit 004 of information on the version of the program to be executed this time from the recording of the version of the program executed in the previous travel after the power of the vehicle control device 001 is turned on. The main program activation unit 004 activates the main program 1A 006 or the main program 1B 007 according to the notified information on the version of the program. FIG. 8 illustrates a case where the main program 1A 006 is activated. After notifying the main program activation unit 004 of the program version, the boot loader 706 transmits the program version to the communication IF 014 of the calculation unit 2 003 using the communication IF 008.

When receiving the program version, the sub-program activation unit 010 of the calculation unit 2 003 that does not have the main program activation unit can select one program from the plurality of programs stored in the program storage area 011 based on the activation result of the main program activation unit 004. As a result of this processing, the calculation unit 2 003 that does not have the main program activation unit can obtain information on the version of the program to be activated in cooperation with the calculation unit 1 002 that has the main program activation unit 004, and the calculation unit 1 002 and the calculation unit 2 003 can execute the consistent program.

When receiving the program version, the communication IF 008 of calculation unit 2 003 transmits the program version to the sub-program selection unit 009 through the boot loader 709.

The sub-program selection unit 009 can select the version of the sub-program based on the version of the main program activated by the main program activation unit 004. By the above-described processing, the calculation unit 2 003 not including the main program activation unit can select the version of the program to be activated in cooperation with the calculation unit 1 002 including the main program activation unit 004. According to the received program version, the version of the program to be activated by the calculation unit 2 003 is determined. The sub-program activation unit 010 is notified of the determination result.

The sub-program activation unit 010 can activate the sub-program 2A 012 or the sub-program 2B 013 on the basis of the selection result of the sub-program selection unit 009 from the received information of the program version. By the above-described processing, the calculation unit 2 003 not including the main program activation unit can activate the version of the program to be activated in cooperation with the calculation unit 1 002 including the main program activation unit 004. In FIG. 8, the sub-program 2A 012 is activated.

Figure 9:
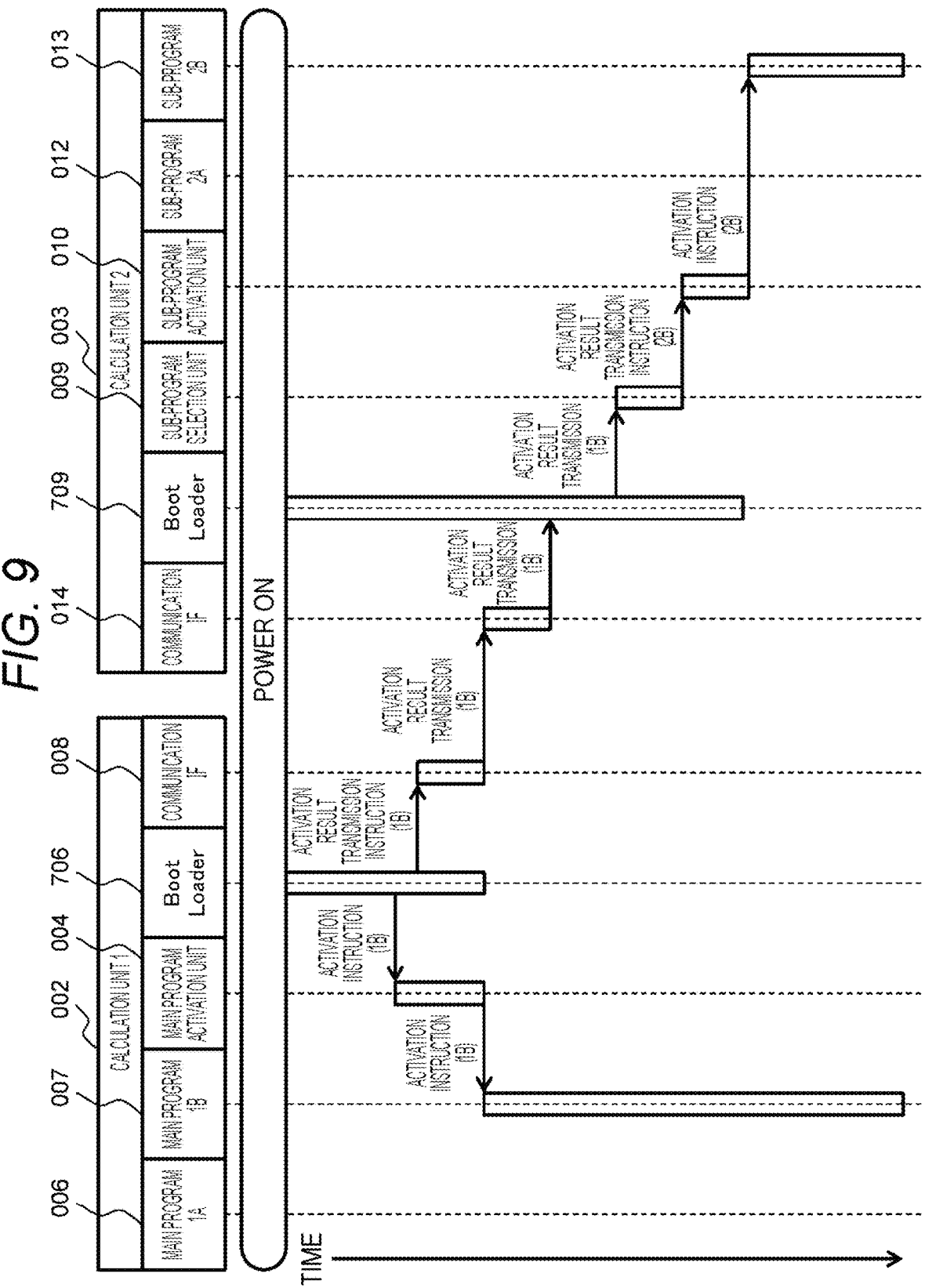
FIG. 9 is a sequence diagram of a notification operation in a case of activating with a program version B.

In FIG. 8, the notification operation of the program version to the calculation unit 2 003 when the calculation unit 1 002 activates the main program 1A 006 has been described. With reference to FIG. 9, the notification operation of the program version to the calculation unit 2 003 when the calculation unit 1 002 activates the main program 1B 007 will be described. FIG. 9 illustrates a relationship among the calculation unit 1 002, the calculation unit 2 003, the main program 1A 006, the main program 1B 007, the main program activation unit 004, the boot loader 706, the communication IF 008, the communication IF 014, the boot loader 709, the sub-program selection unit 009, the sub-program activation unit 010, the sub-program 2A 012, and the sub-program 2B 013.

In FIG. 8, the boot loader 706 included in the calculation unit 1 002 notifies the main program activation unit 004 of information on the version of the program to be executed this time from the recording of the version of the program executed in the previous travel after the power of the vehicle control device 001 is turned on. The main program activation unit 004 activates the main program 1A 006 or the main program 1B 007 from the received information on the program version. In FIG. 9, the main program 1B 803 is activated. After notifying the main program activation unit 004 of the program version, the boot loader 706 transmits the program version to the communication IF 014 of the calculation unit 2 003 using the communication IF 008.

When receiving the program version, the sub-program activation unit 010 of the calculation unit 2 003 that does not have the main program activation unit can select one program from the plurality of programs stored in the program storage area 011 based on the activation result of the main program activation unit 004. As a result of this processing, the calculation unit 2 003 that does not have the main program activation unit can obtain information on the version of the program to be activated in cooperation with the calculation unit 1 002 that has the main program activation unit 004, and the calculation unit 1 002 and the calculation unit 2 003 can execute the consistent program.

When receiving the program version, the communication IF 008 of calculation unit 2 003 transmits the program version to the sub-program selection unit 009 through the boot loader 709.

The sub-program selection unit 009 can select the version of the sub-program based on the version of the main program activated by the main program activation unit 004. By the above-described processing, the calculation unit 2 003 not including the main program activation unit can select the version of the program to be activated in cooperation with the calculation unit 1 002 including the main program activation unit 004. According to the received program version, the version of the program to be activated by the calculation unit 2 003 is determined. The sub-program activation unit 010 is notified of the determination result.

The sub-program activation unit 010 can activate the sub-program 2A 012 or the sub-program 2B 013 on the basis of the selection result of the sub-program selection unit 009 from the received information of the program version. By the above-described processing, the calculation unit 2 003 not including the main program activation unit can activate the version of the program to be activated in cooperation with the calculation unit 1 002 including the main program activation unit 004. In FIG. 9, the sub-program 2B 012 is activated.

A notification operation of the program version to the calculation unit 2 003 when the calculation unit 1 002 activates the main program 1A 006 will be described with reference to FIG. 8. In FIG. 8, the calculation unit 2 003 can activate the version of the program notified from the calculation unit 1 002. However, when the calculation unit 2 003 cannot activate the version of the program notified from the calculation unit 1 002, it is necessary to start the version of the program that can be activated by the calculation unit 2 003 and notify the calculation unit 1 002 of the information.

Figure 10:
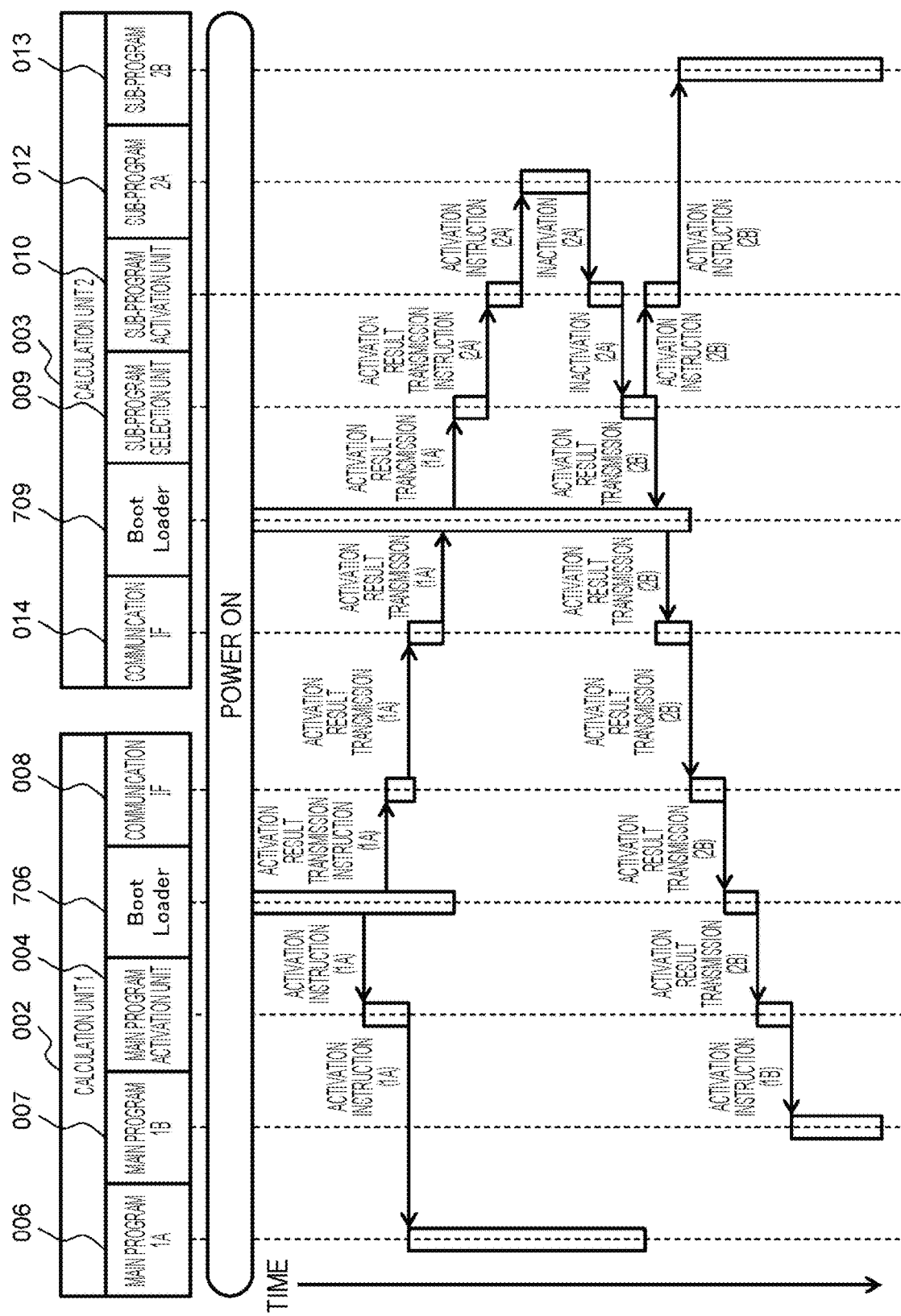
FIG. 10 is a sequence diagram of a notification operation in a case of not operating with the program version A.

An operation of notifying the program version to the calculation unit 1 002 when the calculation unit 2 003 cannot activate the sub-program 2A 012 will be described with reference to FIG. 10. FIG. 10 illustrates a relationship among the calculation unit 1 002, the calculation unit 2 003, the main program 1A 006, the main program 1B 007, the main program activation unit 004, the boot loader 706, the communication IF 008, the communication IF 014, the boot loader 709, the sub-program selection unit 009, the sub-program activation unit 010, the sub-program 2A 012, and the sub-program 2B 013.

In FIG. 10, the boot loader 706 included in the calculation unit 1 002 notifies the main program activation unit 004 of information on the version of the program to be executed this time from the recording of the version of the program executed in the previous travel after the power of the vehicle control device 001 is turned on. The main program activation unit 004 activates the main program 1A 006 or the main program 1B 007 from the received information on the program version. In FIG. 10, the main program 1B 007 is activated. After notifying the main program activation unit 004 of the program version, the boot loader 706 transmits the program version to the communication IF 014 of the calculation unit 2 003 using the communication IF 008.

When receiving the program version, the communication IF 014 of calculation unit 2 003 transmits the program version to the sub-program selection unit 009 through the boot loader 709. According to the received program version, the version of the program to be activated by the calculation unit 2 003 is determined. The sub-program activation unit 010 is notified of the determination result. The sub-program activation unit 010 activates the sub-program 2A 012 or the sub-program 2B 013 from the received information of the program version.

When the sub-program 2A 012 is attempted to be activated but cannot be activated, a version of the sub-program that can be activated is selected in the sub-program storage area, a selection result thereof is transmitted to the main program activation unit 004, and a plurality of types of main programs in the main program storage area 005 are activated based on the selection result. With the above-described processing, it is possible to avoid a state in which the vehicle does not move at all.

When the sub-program activation unit 010 is notified from the sub-program 2A 012 that the sub-program cannot be activated normally, the sub-program activation unit 010 notifies the sub-program selection unit 009 that the sub-program cannot be activated normally. The sub-program selection unit 009 selects the sub-program 2B 013 that can be activated by the calculation unit 2 003 according to the notified information. The sub-program selection unit 009 notifies the sub-program activation unit 010 that the sub-program 2B 013 is activated. The sub-program activation unit 010 activates the sub-program 2B 013. Further, when from the sub-program 2A 012 notifies that the activation cannot be normally executed, the sub-program selection unit 009 notifies the calculation unit 1 002 via the boot loader 709 and the communication IF 014 that the program has been activated by different versions of programs from those notified from the calculation unit 1 002. Note that, this notification to the calculation unit 1 002 may mean that the activation has been performed by different versions of program from those notified from the calculation unit 1 002, may simply mean that the sub-program has not been activated, may mean that the sub-program of the version notified from the calculation unit 1 002 has not been activated, or may mean a version of the program activated by the calculation unit 2 003.

When information is notified from the communication IF 008, the boot loader 706 of the calculation unit 1 002 stops the operation of the main program 1B 007 operating in the calculation unit 1 002. In addition, the boot loader 706 notifies the main program activation unit 004 of the received information of the program version. The main program activation unit 004 changes the version of the program to be activated by the calculation unit 1 002 according to the received information of the program version. The main program activation unit 004 activates the main program 1B 007 according to information on the received program version.

A notification operation of the program version to the calculation unit 2 003 when the calculation unit 1 002 activates the main program 1B 007 will be described with reference to FIG. 9. In FIG. 9, the calculation unit 2 003 can activate the version of the program notified from the calculation unit 1 002. However, when the calculation unit 2 003 cannot activate the version of the program notified from the calculation unit 1 002, it is necessary to start the version of the program that can be activated by the calculation unit 2 003 and notify the calculation unit 1 002 of the information.

Figure 11:
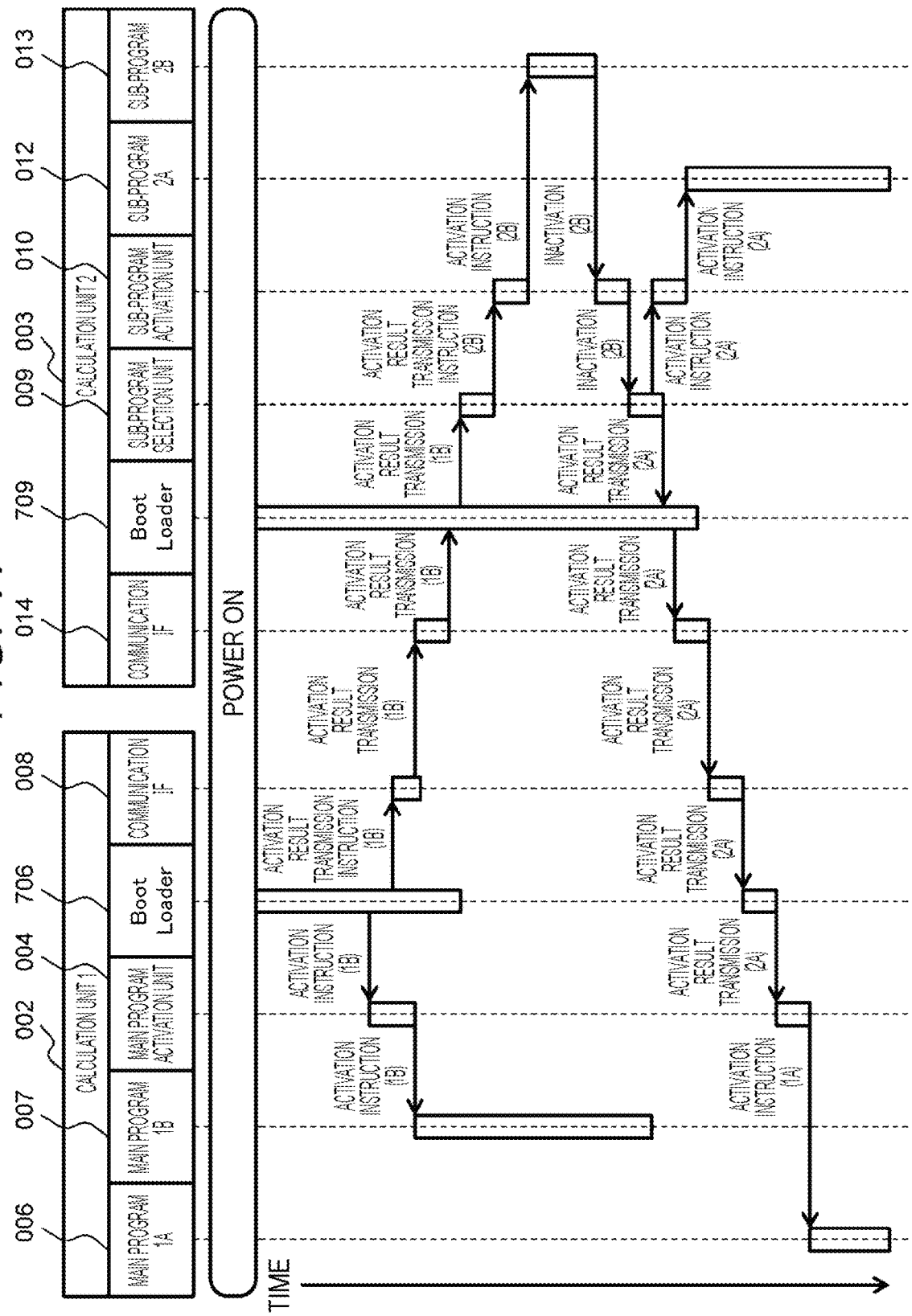
FIG. 11 is a sequence diagram of a notification operation in a case of not operating with the program version B.

An operation of notifying the program version to the calculation unit 1 002 when the calculation unit 2 003 cannot activate the sub-program 2B 012 will be described with reference to FIG. 11. FIG. 11 illustrates a relationship among the calculation unit 1 002, the calculation unit 2 003, the main program 1A 006, the main program 1B 007, the main program activation unit 004, the boot loader 706, the communication IF 008, the communication IF 014, the boot loader 709, the sub-program selection unit 009, the sub-program activation unit 010, the sub-program 2A 012, and the sub-program 2B 013.

In FIG. 11, the boot loader 706 included in the calculation unit 1 002 notifies the main program activation unit 004 of information on the version of the program to be executed this time from the recording of the version of the program executed in the previous travel after the power of the vehicle control device 001 is turned on. The main program activation unit 004 activates the main program 1A 006 or the main program 1B 007 from the received information on the program version. In FIG. 11, the main program 1B 007 is activated. After notifying the main program activation unit 004 of the program version, the boot loader 706 transmits the program version to the communication IF 014 of the calculation unit 2 003 using the communication IF 008.

When receiving the program version, the communication IF 008 of calculation unit 2 003 transmits the program version to the sub-program selection unit 009 through the boot loader 709. According to the received program version, the version of the program to be activated by the calculation unit 2 003 is determined. The sub-program activation unit 010 is notified of the determination result. The sub-program activation unit 010 activates the sub-program 2A 012 or the sub-program 2B 013 from the received information of the program version.

When the sub-program 2B 013 is attempted to be activated but cannot be activated, a version of the sub-program that can be activated is selected in the sub-program storage area, a selection result thereof is transmitted to the main program activation unit 004, and a plurality of types of main programs in the main program storage area 005 are activated based on the selection result. With the above-described processing, it is possible to avoid a state in which the vehicle does not move at all.

When the sub-program activation unit 010 is notified from the sub-program 2B 013 that the sub-program cannot be activated normally, the sub-program activation unit 010 notifies the sub-program selection unit 009 that the sub-program cannot be activated normally. The sub-program selection unit 009 selects the sub-program 2B 013 that can be activated by the calculation unit 2 003 according to the notified information. The sub-program selection unit 009 notifies the sub-program activation unit 010 that the sub-program 2B 013 is activated. The sub-program activation unit 010 activates the sub-program 2B 013. Further, when from the sub-program 2A 012 notifies that the activation cannot be normally executed, the sub-program selection unit 009 notifies the calculation unit 1 002 via the boot loader 709 and the communication IF 014 that the program has been activated by different versions of programs from those notified from the calculation unit 1 002. Note that, this notification to the calculation unit 1 002 may mean that the activation has been performed by different versions of program from those notified from the calculation unit 1 002, may simply mean that the sub-program has not been activated, may mean that the sub-program of the version notified from the calculation unit 1 002 has not been activated, or may mean a version of the program activated by the calculation unit 2 003.

When information is notified from the communication IF 008, the boot loader 706 of the calculation unit 1 002 stops the operation of the main program 1B 007 operating in the calculation unit 1 002. In addition, the boot loader 706 notifies the main program activation unit 004 of the received information of the program version. The main program activation unit 004 changes the version of the program to be activated by the calculation unit 1 002 according to the received information of the program version. The main program activation unit 004 activates the main program 1B 007 according to information on the received program version.

As described above, according to the first embodiment of the present invention, even if the calculation unit 1 002 and the calculation unit 2 003 independently have a plurality of versions of the program, the other calculation unit can activate a version of the program matching the activation result of the version of the program activated by one calculation unit. When the version of the sub-program matching the version of the main program activated by the calculation unit 1 002 cannot be activated, the calculation unit 2 003 notifies the calculation unit 1 002 of the activation status of the sub-program, so that the calculation unit 1 002 can activate the version of the main program matching the calculation unit 2 003.

Next, variations of the vehicle control device 001 including a plurality of calculation units will be described according to second to fourth embodiments.

Second Embodiment

Figure 12:
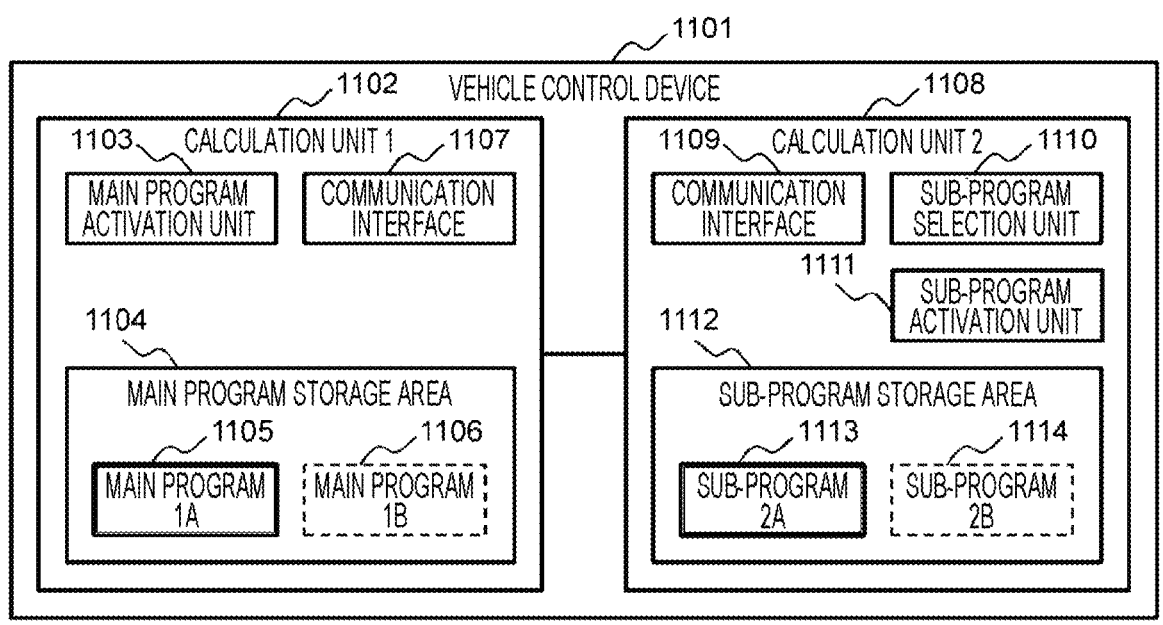
FIG. 12 is a configuration diagram of a vehicle control device including two calculation units.

FIG. 12 is a configuration diagram of a system (vehicle control device) including two calculation units according to a second embodiment of the present invention. A vehicle control device 1101 of the present embodiment includes a calculation unit 1 1102 and a calculation unit 2 1108. The calculation unit 1 1102 includes a main program activation unit 1103 and a main program storage area 1104, and the main program storage area 1104 includes a main program 1A 1105 and a main program 1B 1106 which are programs of the same type having different versions. In the illustrated state, the main program 1A 1105 is activating, and the main program 1B 1106 is not activating. A communication interface 1107 transmits information on the version of the program activated by the calculation unit 1 1102 to the calculation unit 2 1108.

The calculation unit 2 1108 includes a sub-program selection unit 1110, a sub-program activation unit 1111, and a sub-program storage area 1112, and the sub-program storage area 1112 includes a sub-program 2A 1113 and a sub-program 2B 1114 which are the same type of programs with different versions. In the illustrated state, the sub-program 2A 1113 is activating, and the sub-program 2B 1114 is not activating. A communication interface 1109 receives information on the version of the program activated by the calculation unit 1 1102 from the calculation unit 1 1102.

The vehicle control device 1101 is a vehicle control device that has a processor capable of executing an independent program in each of the calculation units 1102 and 1108 and is compatible with an online update function capable of updating the program executed in each of the calculation units 1102 and 1108 according to the version.

By executing the main program activation unit 1103 at the time of activation, the calculation unit 1 1102 determines and activates the version of the program to be activated this time according to information of the program version executed in the previous travel among the main program 1A 1105 or the main program 1B 1106 stored in the main program storage area 1104. Information on the version of the activated program is transmitted to the calculation unit 2 1108 via the communication interface 1107.

The version of the program activated by the calculation unit 1 1102 is notified to the calculation unit 2 1108 from the calculation unit 1 1102 via the communication interface 1109. The sub-program selection unit 1110 that has received the notification determines information on the version of the program to be activated by the calculation unit 2 1108 according to the information on the version of the program activated by calculation unit 1 1102. The determined version of the program is notified to the sub-program activation unit 1111. The sub-program activation unit 1111 activates either the sub-program 2A 1113 or the sub-program 2B 1114 stored in the sub-program storage area 1112 according to the determination by the sub-program selection unit 1110.

Third Embodiment

Figure 13:
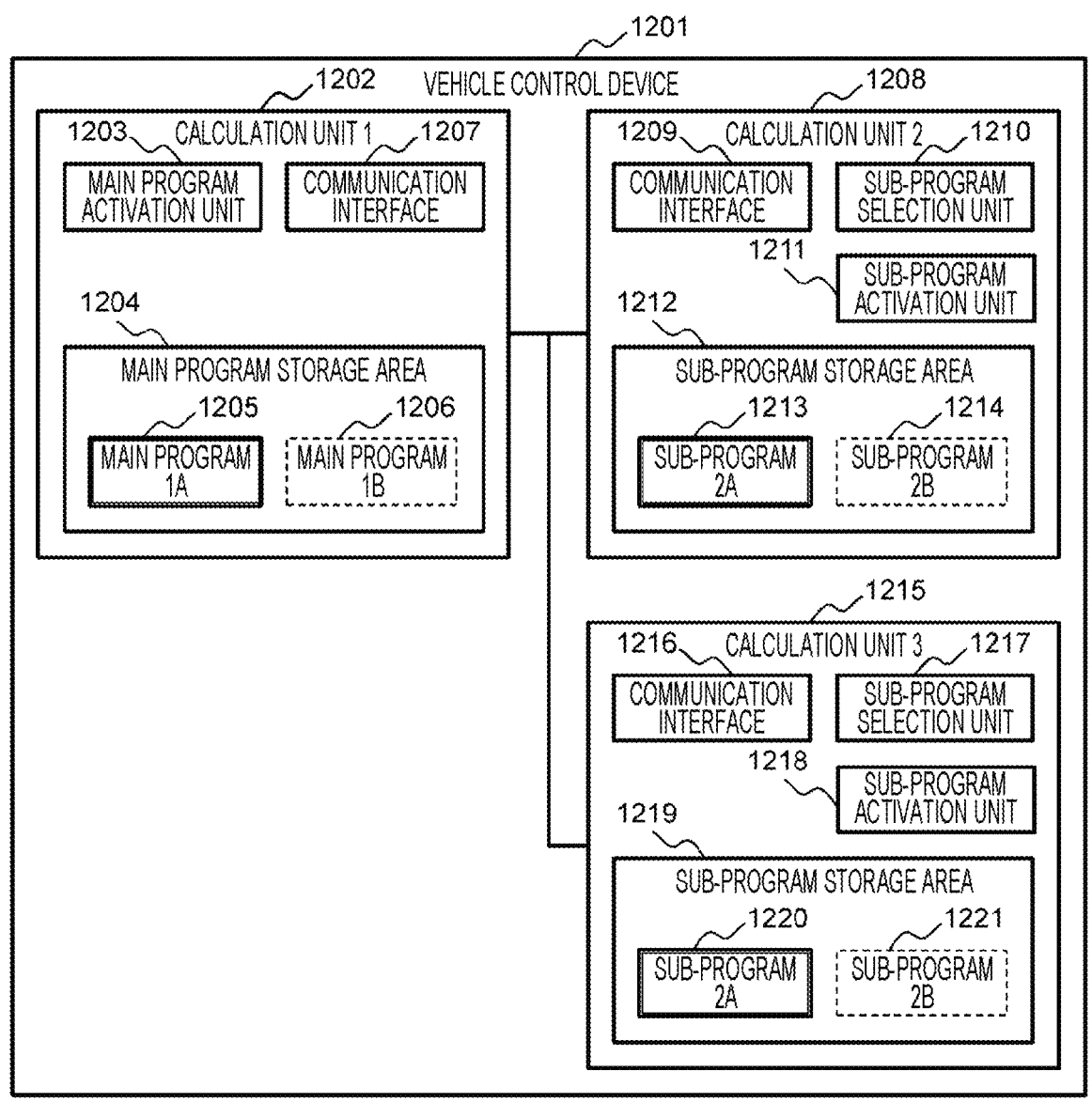
FIG. 13 is a configuration diagram of a vehicle control device including three calculation units.

FIG. 13 is a configuration diagram of a system (vehicle control device) including three calculation units according to a third embodiment of the present invention. A vehicle control device 1201 of the present embodiment includes a calculation unit 1 1202, a calculation unit 2 1208, and a calculation unit 3 1215. The calculation unit 1 1202 includes a main program activation unit 1203 and a main program storage area 1204, and the main program storage area 1204 includes a main program 1A 1205 and a main program 1B 1206 which are programs of the same type having different versions. In the illustrated state, the main program 1A 1205 is activating, and the main program 1B 1206 is not activating. A communication interface 1207 transmits information on the version of the program activated by the calculation unit 1 1202 to the calculation unit 2 1208 and the calculation unit 3 1215.

The calculation unit 2 1208 includes a sub-program selection unit 1210, a sub-program activation unit 1211, and a sub-program storage area 1212, and the sub-program storage area 1212 includes a sub-program 2A 1213 and a sub-program 2B 1214 which are the same type of programs with different versions. In the illustrated state, the sub-program 2A 1213 is activating, and the sub-program 2B 1214 is not activating. A communication interface 1209 receives information on the version of the program activated by the calculation unit 1 1202 from the calculation unit 1 1202.

The calculation unit 3 1215 includes a sub-program selection unit 1217, a sub-program activation unit 1218, and a sub-program storage area 1219, and the sub-program storage area 1219 includes a sub-program 3A 1220 and a sub-program 3B 1221 which are the same type of programs with different versions. In the illustrated state, the sub-program 3A 1220 is running, and the sub-program 3B 1221 is not running. A communication interface 1216 receives information on the version of the program activated by the calculation unit 1 1202 from the calculation unit 1 1202.

The vehicle control device 1201 is a vehicle control device that has a processor capable of executing an independent program in each of the calculation units 1202, 1208, and 1215 and is compatible with an online update function capable of updating the program executed in each of the calculation units 1202, 1208, and 1215 according to the version.

By executing the main program activation unit 1203 at the time of activation, the calculation unit 1 1202 determines and activates the version of the program to be activated this time according to the information of the program version executed in the previous travel among the main program 1A 1205 or the main program 1B 1206 stored in the main program storage area 1204. Information on the version of the activated program is transmitted to the calculation unit 2 1208 and the calculation unit 3 1215 via the communication interface 1207.

The version of the program activated by the calculation unit 1 1202 is notified to the calculation unit 2 1208 from the calculation unit 1 1202 via the communication interface 1209. The sub-program selection unit 1210 that has received the notification determines information on the version of the program to be activated by the calculation unit 2 1208 according to the information on the version of the program activated by calculation unit 1 1202.

The determined version of the program is notified to the sub-program activation unit 1211. The sub-program activation unit 1211 activates either the sub-program 2A 1213 or the sub-program 2B 1214 stored in the sub-program storage area 1212 according to the determination by the sub-program selection unit 1210.

The version of the program activated by the calculation unit 1 1202 is notified to the calculation unit 3 1215 from the calculation unit 1 1202 via the communication interface 1216. The sub-program selection unit 1217 that has received the notification determines the version of the program to be activated by the calculation unit 3 1215 according to the information on the version of the program activated by the calculation unit 1 1202.

The determined version of the program is notified to the sub-program activation unit 1218. The sub-program activation unit 1218 activates either the sub-program 2A 1220 or the sub-program 2B 1221 stored in the sub-program storage area 1219 according to the determination by the sub-program selection unit 1217.

Fourth Embodiment

Figure 14:
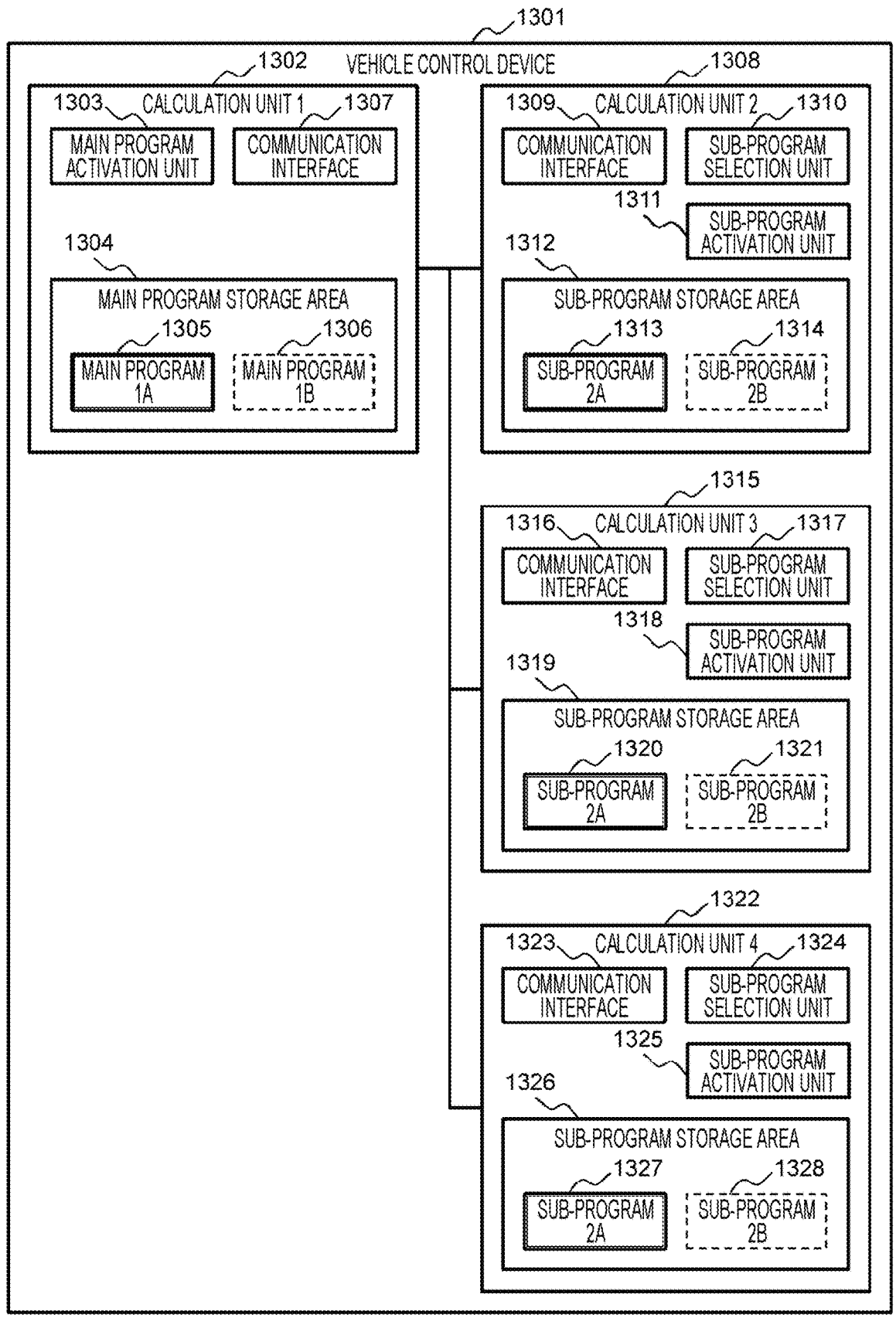
FIG. 14 is a configuration diagram of a vehicle control device including four calculation units.

FIG. 14 is a configuration diagram of a system (vehicle control device) including four calculation units according to a fourth embodiment of the present invention. A vehicle control device 1301 of the present embodiment includes a calculation unit 1 1302, a calculation unit 2 1308, a calculation unit 3 1315, and a calculation unit 4 1322. The calculation unit 1 1302 includes a main program activation unit 1303 and a main program storage area 1304, and the main program storage area 1304 includes a main program 1A 1305 and a main program 1B 1306 which are programs of the same type having different versions. In the illustrated state, the main program 1A 1305 is activating, and the main program 1B 1306 is not activating. A communication interface 1307 transmits information on the version of the program activated by the calculation unit 1 1302 to the calculation unit 2 1308, the calculation unit 3 1315 and the calculation unit 4 1322.

The calculation unit 2 1308 includes a sub-program selection unit 1310, a sub-program activation unit 1311, and a sub-program storage area 1312, and the sub-program storage area 1312 includes a sub-program 2A 1313 and a sub-program 2B 1314 which are the same type of programs with different versions. In the illustrated state, the sub-program 2A 1313 is running, and the sub-program 2B 1314 is not running. A communication interface 1309 receives information on the version of the program activated by the calculation unit 1 1302 from the calculation unit 1 1302.

The calculation unit 3 1315 includes a sub-program selection unit 1317, a sub-program activation unit 1318, and a sub-program storage area 1319, and the sub-program storage area 1319 includes a sub-program 3A 1320 and a sub-program 3B 1321 which are the same type of programs with different versions. In the illustrated state, the sub-program 3A 1320 is running, and the sub-program 3B 1321 is not running. A communication interface 1316 receives information on the version of the program activated by the calculation unit 1 1302 from the calculation unit 1 1302.

The calculation unit 4 1322 includes a sub-program selection unit 1324, a sub-program activation unit 1325, and a sub-program storage area 1326, and the sub-program storage area 1326 includes a sub-program 4A 1327 and a sub-program 4B 1328 which are the same type of programs with different versions. In the illustrated state, the sub-program 4A 1327 is running, and the sub-program 4B 1328 is not running. A communication interface 1323 receives information on the version of the program activated by the calculation unit 1 1302 from the calculation unit 1 1302.

The vehicle control device 1301 is a vehicle control device that has a processor capable of executing an independent program in each of the calculation units 1302, 1308, 1315, and 1322 and is compatible with an online update function capable of updating the program executed in each of the calculation units 1202, 1208, and 1215 according to the version.

By executing the main program activation unit 1303 at the time of activation, the calculation unit 1 1302 determines and activates the version of the program to be activated this time according to the information of the program version executed in the previous travel among the main program 1A 1305 or the main program 1B 1306 stored in the main program storage area 1304. Information on the version of the activated program is transmitted to the calculation unit 2 1308, the calculation unit 3 1315, and the calculation unit 4 1322 via the communication interface 1307.

The version of the program activated by the calculation unit 1 1302 is notified to the calculation unit 2 1308 from the calculation unit 1 1302 via the communication interface 1309. The sub-program selection unit 1310 that has received the notification determines the version of the program to be activated by the calculation unit 2 1308 according to the information on the version of the program activated by the calculation unit 1 1302.

The determined version of the program is notified to the sub-program activation unit 1311. The sub-program activation unit 1311 activates either the sub-program 2A 1313 or the sub-program 2B 1314 stored in the sub-program storage area 1312 according to the determination by the sub-program selection unit 1310.

The version of the program activated by the calculation unit 1 1302 is notified to the calculation unit 3 1315 from the calculation unit 1 1302 via the communication interface 1316. The sub-program selection unit 1317 that has received the notification determines the version of the program to be activated by the calculation unit 2 1315 according to the information on the version of the program activated by the calculation unit 1 1302.

The determined version of the program is notified to the sub-program activation unit 1318. The sub-program activation unit 1318 activates either the sub-program 3A 1320 or the sub-program 3B 1321 stored in the sub-program storage area 1319 according to the determination by the sub-program selection unit 1317.

The version of the program activated by the calculation unit 1 1302 is notified to the calculation unit 4 1322 from the calculation unit 1 1302 via the communication interface 1323. The sub-program selection unit 1317 that has received the notification determines the version of the program to be activated by the calculation unit 4 1322 according to the information on the version of the program activated by the calculation unit 1 1302.

The determined version of the program is notified to the sub-program activation unit 1325. The sub-program activation unit 1325 activates either the sub-program 4A 1327 or the sub-program 4B 1328 stored in the sub-program storage area 1326 according to the determination by the sub-program selection unit 1324.

As described above, in the vehicle control device according to the embodiment of the present invention, the main calculation unit (calculation unit 1 002) includes the main program activation unit 004 that activates one main program from a plurality of main programs 006 and 007, and the sub-calculation unit (calculation unit 2 003) includes the sub-program selection unit 009 that selects sub-programs 012 and 013 to be activated by a sub-calculation unit 003 based on the activation result of the main program activation unit 004, and the sub-program activation unit 010 that activates one sub-program based on the selection result of the sub-program selection unit 009. Therefore, even if each calculation unit independently has a different program, another calculation unit can activate a program matching the activation result of the program activated by one calculation unit.

In addition, the main program storage area 005 stores the main programs 006 and 007 of different versions, the sub-program storage area 011 stores the sub-programs 012 and 013 of different versions, and the sub-program selection unit 009 selects the version of the sub-program based on the version of the main program activated by the main program activation unit 004. Therefore, even if each calculation unit independently has a plurality of versions of programs, another calculation unit can activate a program of a version matching the activation result of the version of the program activated by one calculation unit.

In addition, when the sub-program is not normally activated, the sub-program selection unit 009 selects the activatable sub-program, the sub-program activation unit 010 activates the activatable sub-program based on the selection result of the sub-program selection unit 009, and the main program activation unit 004 activates one main program based on the selection result of the sub-calculation unit 003, so that the main program having a version matching the version of the activatable sub-program can be activated.

In addition, in a case where the programs of the correct combination cannot be activated by the main calculation unit 002 and the sub-calculation unit 003, since the vehicle control device 001 is not activated, the vehicle does not travel in a dangerous state, and safety can be secured.

In addition, in a case where the vehicle control device 001 is not activated, the other vehicle control device is notified of the failure, so that the execution of the processing related to the non-operating vehicle control device can be stopped in the other vehicle control device, and a malfunction of the vehicle control device can be prevented.

When the vehicle control device 001 is not activated, the failure state is recorded, so that the failure state can be verified at a later date.

Note that, the present invention is not limited to the above-described embodiments, and includes various modifications and equivalent configurations within the spirit of the appended claims. For example, the above-described examples are described in detail in order to describe the present invention in an easy-to-understand manner, and the present invention is not necessarily limited to those having all the described configurations. Further, a part of the configuration of one example may be substituted with the configuration of another example. In addition, the configuration of another example may be added to the configuration of a certain example.

In addition, a part of the configuration of each example may be added, deleted, or replaced with another configuration.

In addition, a part or all of the above-described configurations, functions, processing units, processing means, and the like may be realized by hardware by, for example, designing with an integrated circuit, or may be realized by software by a processor interpreting and executing a program for realizing each function.

Information such as a program, a table, and a file for realizing each function can be stored in a recording device such as a memory, a hard disk, and a solid state drive (SSD), or a recording medium such as an IC card, an SD card, a DVD, and BD.

In addition, control lines and information lines indicate what is considered necessary for explanation, and not all control lines and information lines necessary for implementation are indicated. In practice, it may be considered that almost all the configurations are connected to each other.

REFERENCE SIGNS LIST 001 vehicle control device (Target ECU)
002 calculation unit 1
003 calculation unit 2
004 main program activation unit
005 main program storage area
006 main program 1A
007 main program 1B
008, 014 communication interface
009 sub-program selection unit
010 sub-program activation unit
011 sub-program storage area
012 sub-program 2A
013 sub-program 2B
015 external device
101 OTA CENTER
102 antenna ECU
103 CGW
202 cipher text
203 segmented encryption
211 cipher text
212 plain text
213 primary storage RAM
214 flash memory
311 program update processing unit
312 update target unit
313 decoding processing unit
321 reprodata (block A4)
322, 324 Positive Response
323 reprodata (block A5)
410 software house
706, 709 boot loader
1101 vehicle control device
1102 calculation unit 1
1103 main program activation unit
1104 main program storage area
1105 main program 1A
1106 main program 1B
1107 communication interface
1108 calculation unit 2
1109 communication interface
1110 sub-program selection unit
1111 sub-program activation unit
1112 sub-program storage area
1113 sub-program 2A
1114 sub-program 2B
1201 vehicle control device
1202 calculation unit 1
1203 main program activation unit
1204 main program storage area
1205 main program 1A
1206 main program 1B
1207 communication interface
1208 calculation unit 2
1209 communication interface
1210 sub-program selection unit
1211 sub-program activation unit
1212 sub-program storage area
1213 sub-program 2A
1214 sub-program 2B
1215 calculation unit 3
1216 communication interface
1217 sub-program selection unit
1218 sub-program activation unit
1219 sub-program storage area
1220 sub-program 3A
1221 sub-program 3B
1301 vehicle control device
1302 calculation unit 1
1303 main program activation unit
1304 main program storage area
1305 main program 1A
1306 main program 1B
1307 communication interface
1308 calculation unit 2
1309 communication interface
1310 sub-program selection unit
1311 sub-program activation unit
1312 sub-program storage area
1313 sub-program 2A
1314 sub-program 2B
1315 calculation unit 3
1316 communication interface
1317 sub-program selection unit
1318 sub-program activation unit
1319 sub-program storage area
1320 sub-program 3A
1321 sub-program 3B
1322 calculation unit 4
1323 communication interface
1324 sub-program selection unit
1325 sub-program activation unit
1326 sub-program storage area
1327 sub-program 4A
1328 sub-program 4B

The invention claimed is:

1. A vehicle control device that controls a vehicle, comprising:
a plurality of calculation units implemented in hardware that execute calculation processing for vehicle control; and
a plurality of program storage areas implemented in hardware that store a plurality of programs in which a procedure of the calculation processing is defined,
wherein
the plurality of program storage areas include a main program storage area that stores a plurality of main programs and a sub-program storage area that stores a plurality of sub-programs, the plurality of calculation units include a main calculation unit that activates and executes one of the plurality of main programs and a sub-calculation unit that activates and executes one of the plurality of sub-programs, the main calculation unit includes a main program activation unit that activates one main program from the plurality of main programs, and the sub-calculation unit includes
- a sub-program selection unit that selects a sub-program to be activated by the sub-calculation unit based on an activation result of the main program activation unit, and
- a sub-program activation unit that activates one sub-program based on a selection result of the sub-program selection unit.

2. The vehicle control device according to claim 1, wherein each of the main program storage area and the sub-program storage area is rewritable, the main program storage area stores main programs of different versions, the sub-program storage area stores sub-programs of different versions, and the sub-program selection unit selects a version of the sub program based on a version of the main program activated by the main program activation unit.

3. The vehicle control device according to claim 1, wherein when the sub-program is not normally activated, the sub-program selection unit selects an activatable sub-program, the sub-program activation unit activates the activatable sub-program based on a selection result of the sub-program selection unit, and the main program activation unit activates one main program based on a selection result of the sub-calculation unit.

4. The vehicle control device according to claim 1, wherein when programs of a correct combination are not activated by the main calculation unit and the sub-calculation unit, the vehicle control device is not activated.

5. The vehicle control device according to claim 4, wherein when the vehicle control device is not activated, the vehicle control device notifies another vehicle control device of a failure.

6. The vehicle control device according to claim 4, wherein when the vehicle control device is not activated, a failure state is recorded.

7. A program management method for managing a program for a vehicle control device to control a vehicle, wherein the vehicle control device includes
- a plurality of calculation units that execute calculation processing for vehicle control; and
- a plurality of program storage areas that store a plurality of programs in which a procedure of the calculation processing is defined, the plurality of program storage areas include a main program storage area that stores a plurality of main programs and a sub-program storage area that stores a plurality of sub-programs, and the plurality of calculation units include a main calculation unit that activates and executes one of the plurality of main programs and a sub-calculation unit that activates and executes one of the plurality of sub-programs, the program management method comprising:

a main program activation procedure in which the main calculation unit activates one main program from the plurality of main programs;

a sub-program selection procedure in which the sub-calculation unit selects a sub-program to be activated by the sub-calculation unit based on an activation result of the main program activation procedure; and a sub-program activation procedure in which the sub-calculation unit activates one sub-program based on a selection result of the sub-program selection procedure.

* * * * *